(12) United States Patent
Spandern et al.

(10) Patent No.: US 8,016,086 B2
(45) Date of Patent: Sep. 13, 2011

(54) FRICTION LINING

(75) Inventors: Christian Spandern, Elkenroth (DE); Michael Hofmann, Limburg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/632,128

(22) Filed: Dec. 7, 2009

(65) Prior Publication Data

US 2010/0080960 A1    Apr. 1, 2010

Related U.S. Application Data

(63) Continuation of application No. PCT/DE2008/000474, filed on Mar. 18, 2008.

(30) Foreign Application Priority Data

Jun. 8, 2007 (DE) .......................... 10 2007 026 657

(51) Int. Cl.
    B60T 1/06 (2006.01)

(52) U.S. Cl. ................................. 188/218 XL; 188/18 A

(58) Field of Classification Search .............. 188/251 A, 188/251 R, 250 R; 428/292.1, 299, 35, 65, 428/65.9, 66, 260, 281–283, 286, 287, 288, 428/290, 300, 542.8
See application file for complete search history.

(56) References Cited

U.S. PATENT DOCUMENTS

| | | | |
|---|---|---|---|
| 4,118,528 A | * | 10/1978 | Lowry .......................... 428/66.2 |
| 4,384,640 A | * | 5/1983 | Trainor et al. ............ 192/107 M |
| 5,323,978 A | | 6/1994 | Watkins |

FOREIGN PATENT DOCUMENTS

| | | |
|---|---|---|
| DE | 44 20 291 A | 5/1995 |
| DE | 10 2004 038 773 Y | 3/2005 |
| EP | 0 250 615 Y | 1/1988 |
| GB | 2 269 640 XY | 2/1994 |
| WO | 2007/121704 PX | 11/2007 |

* cited by examiner

*Primary Examiner* — Melanie Torres Williams
(74) *Attorney, Agent, or Firm* — Lucas & Mercanti, LLP

(57) ABSTRACT

A method for the production of a friction lining. The friction lining is produced in alternating layers wound in a helical shape and a star shape.

14 Claims, 3 Drawing Sheets

FRICTION LINING

This application is a continuation application of PCT/DE2008/000474 filed Mar. 18, 2008, which in turn claims the priority of DE 10 2007 026 657.1, filed Jun. 8, 2007, the priority of both applications is hereby claimed and both applications are incorporated by reference herein.

FIELD OF THE INVENTION

The invention relates to a friction lining and to a method for producing a friction lining, in particular for clutch disks, brakes or the like, according to the preamble of claims 1 and 12.

BACKGROUND OF THE INVENTION

Clutch linings of this type are used particularly for friction clutches in motor vehicles, in which they are riveted to a metallic carrier plate or clutch disk, in order to enable, in conjunction with a counterelement, a force transmission between an engine and a transmission in the coupled state and, with the clutch open, to decouple said force transmission.

In this case, the clutch linings have to satisfy stringent requirements because they should fulfill many requirements which cannot readily be achieved in the same way. In particular, the clutch lining should have a high burst rotational speed, so as not to be destroyed by centrifugal forces, should have a high coefficient of friction by means of which a high torque can be transferred, and should at the same time have low wear and be resistant to deforming distortion due to heat and/or force influences. Nevertheless, the clutch linings should be capable of being produced in as uncomplicated a way as possible and therefore economically.

To increase the bursting strength, that is to say the strength of the clutch lining in the circumferential direction, it is already known to deposit a binder-impregnated yarn material in a plurality of flat plies in a wavy manner in the circumferential direction, the turns of this strand material having radially inner and radially outer reversal regions which lie on concentric circles (DE 44 20 291 B4). In particular, the reversal regions of the turns may in each case be distributed to a plurality of concentric circles having different diameters, the radii of the circles differing from one another sufficiently to avoid thickenings at the margins of the clutch lining or lining body which may otherwise lead to pressure damage to the yarn material. The fraction of yarn material in the overall composition of the lining body material can consequently be increased.

Winding mostly takes place with the aid of a winding machine, one ply being wound in a circumferential direction per revolution, as defined.

Such yarn material wound in the form of an annular disk, as shown, for example, in FIG. 1, is also designated as a winding or preform. The imaginary circle with an outside diameter of the friction part in the form of an annular disk is itself also designated as the outside diameter of the winding, and the same applies to the inside diameter. The radially inner and radially outer reversal regions of the turns on the yarn material wound in the form of an annular disk are tangent to the inside and the outside diameter of the winding.

The winding ratio indicates how often the yarn in each case is tangent to an imaginary circle with an outside diameter of the friction part in the form of an annular disk or of the dimensionally similar reinforcing part, or, in other words, how often the yarn is tangent to the outside diameter during one revolution of an annular part. A winding ratio of 1:2.6 states that the yarn touches the outside diameter 2.6 times during one revolution on account of the turns. A winding ratio of 1:4 is in this case lower than a winding ratio of 1:5 and is not to be interpreted in the sense of a division.

When a spiral is wound, winding may be carried out from the inside diameter to the outside diameter, or vice versa. In order to wind such a spiral, the winding machine requires a plurality of revolutions from tangent to the inside diameter as far as tangent to the outside diameter, or vice versa. This required number of revolutions corresponds to the number of turns of the spiral.

SUMMARY OF THE INVENTION

The object on which the invention is based is to propose a friction lining, the set-up of which allows a further improvement in terms of rotational speed strength and of dimensional stability.

The solution according to the invention is obtained by means of a method for producing a friction lining. According to this method, the friction lining is produced from at least one winding. The winding consists of a plurality of plies of at least one impregnated yarn and a plurality of layers. The winding is wound from a predetermined number of two alternately successive layers. In this case, one layer is wound from a first predetermined number of spirals which each have a predetermined number of turns. The other layer is wound from a second predetermined number of plies wound in a star-shaped manner.

In a preferred embodiment, the two layers are wound from different yarn material.

In a preferred embodiment, a spiral is wound from 2 to 100, particularly preferably 5 turns.

In a further preferred embodiment, the first number amounts to 1 to 100 spirals.

In a further preferred embodiment, the second number amounts to 1 to 100 plies, preferably 5 plies with a winding ratio between 1:1.0 and 1:6.0, preferably of between 1:2.0 and 1:5.0.

In a preferred embodiment, there is provision for the number of two alternately successive layers to lie between 1 and 100.

In a further embodiment, there is provision for the winding to be wound from an additional layer continuing the alternating layer sequence, so that the two outer faces or outer layers of the winding have the same layer type.

In further preferred embodiments, there is provision for the ply wound in a star-shaped manner to be implemented in involute form or the form of an arc of a circle or in an S-form or polygonal form.

According to the method described above, a friction lining can be produced with the corresponding specifications, resulting from the method, with regard to layering, to the number of plies and turns and to the form of the laying pattern of the yarn or yarns and also to the yarn type.

BRIEF DESCRIPTION OF THE DRAWINGS

Further advantages and advantageous refinements of the invention are the subject matter of the following figures and their description parts. In the figures, in particular.

DETAILED DESCRIPTION OF THE INVENTION

Figure 1:
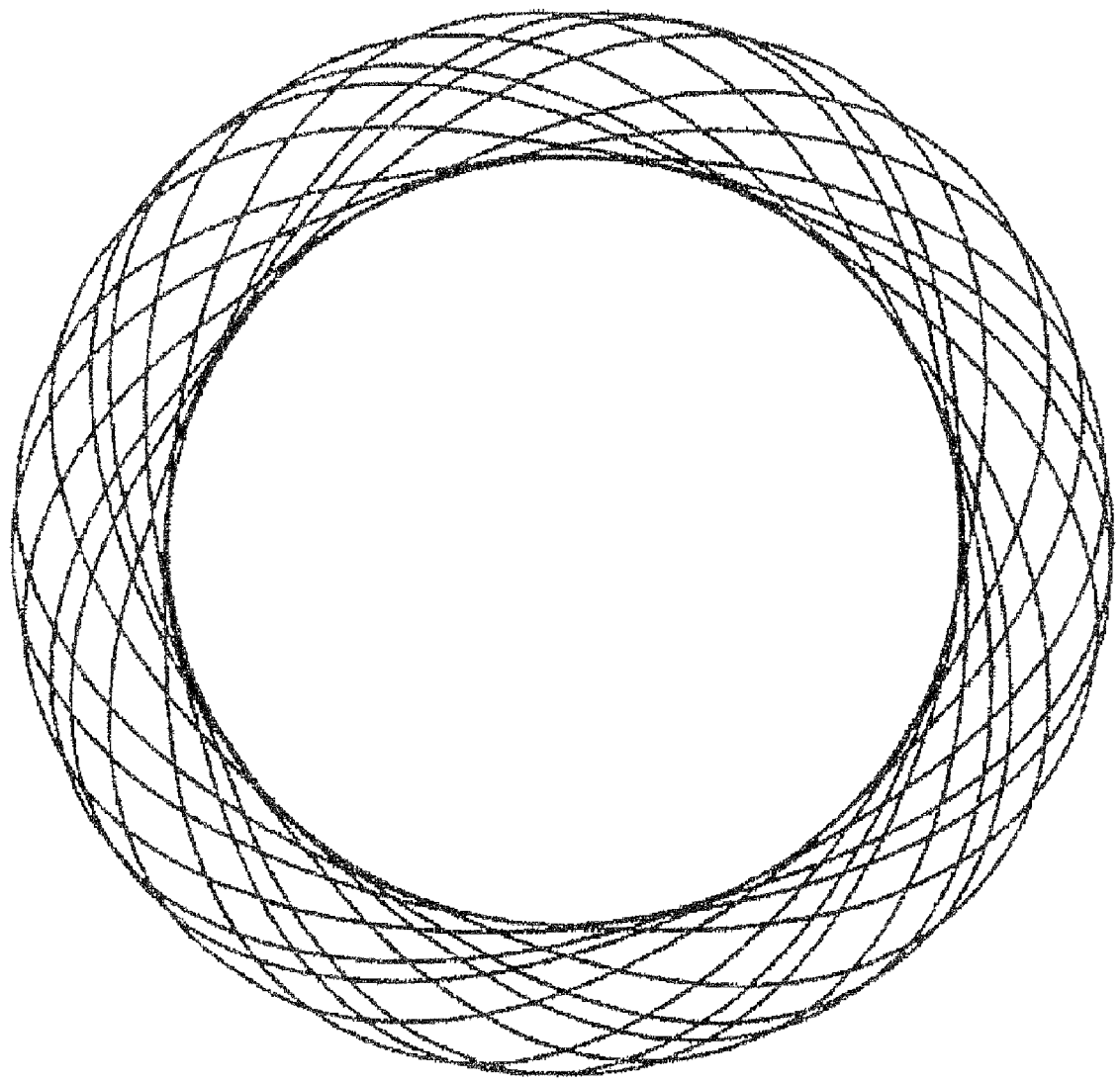
FIG. 1 shows a winding according to the prior art.

FIG. 1 shows a winding according to the prior art.

Such a winding may be wound, for example, from an impregnated yarn. In this case, yarn optimized in terms of coefficient of friction and of wear is drawn through an impregnating solution and is brought to a constant weight ratio of yarn to impregnating solution. The yarn is subsequently dried. For example, a carded yarn consisting of aramid fibers, staple glass fibers, viscose fibers and PAN fibers and also brass wire may be used. Another example is a mixed filament yarn consisting of glass filament and metal wires. The various yarns may also be used as a combination. A dispersion consisting of polymeric components, fillers and solvents is suitable as an impregnating solution. The polymeric components may consist of thermosetting components, such as, for example, phenolic resin or melamine resin, and also elastomeric components, such as, for example, SBR or NBR rubber. Fillers are, for example, barium sulfate, kaolin or carbon black. The solvent used is usually water. The dried yarn is subsequently wound into a winding.

To improve the friction lining properties, a winding may also be constructed from a plurality of plies or layers of different types of impregnated yarn. First, for example, a lower layer and then, for example, with another yarn, a layer lying above it are wound. In this context, the winding ratios of the two layers may differ from one another.

Usually, a winding produced in this way is subsequently pressed under time and temperature control, then hardened and deburred and finally ground and drilled.

Figure 2:
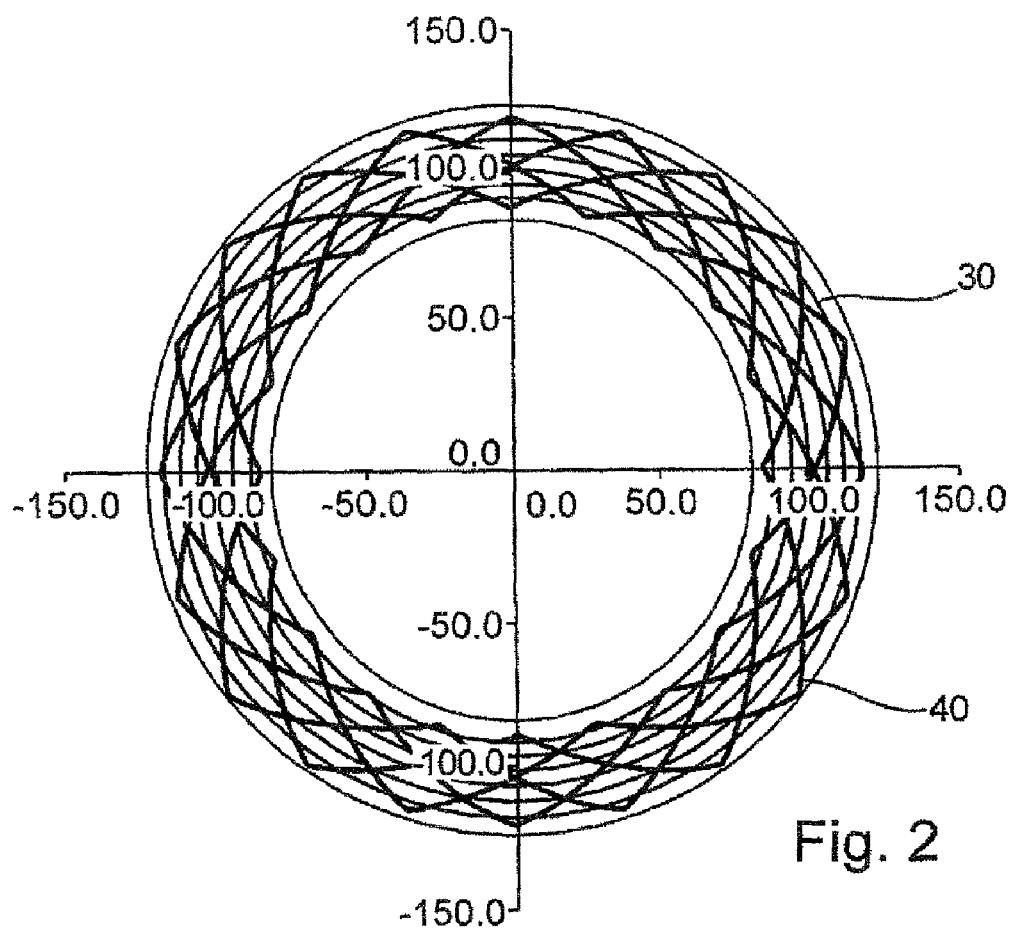
FIG. 2 shows a two-layer winding schematically.
Figure 3:
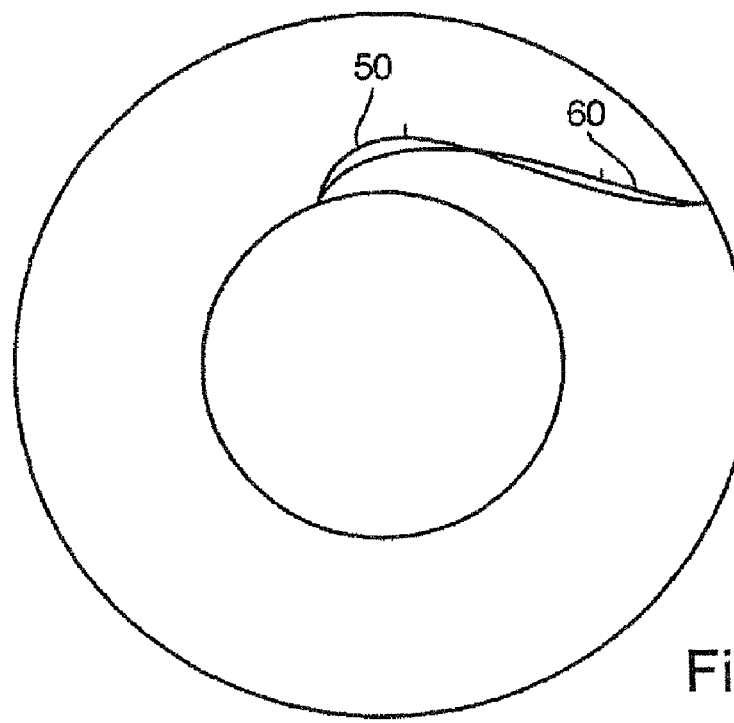
FIG. 3 shows an S-shaped winding pattern schematically.
Figure 4:
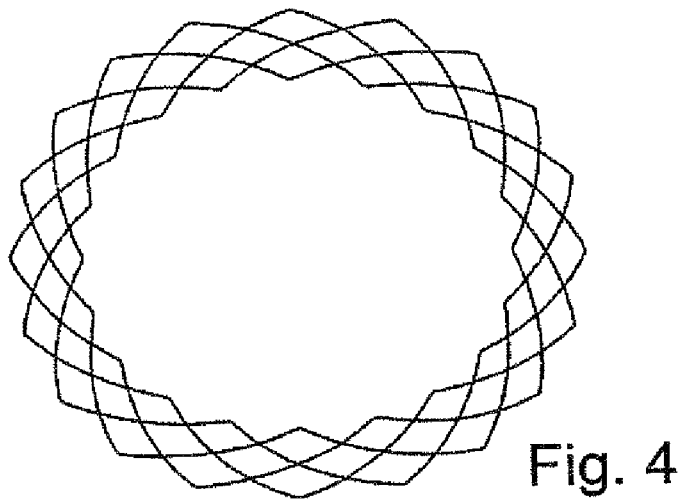
FIG. 4 shows an involute winding pattern schematically.
Figure 5:
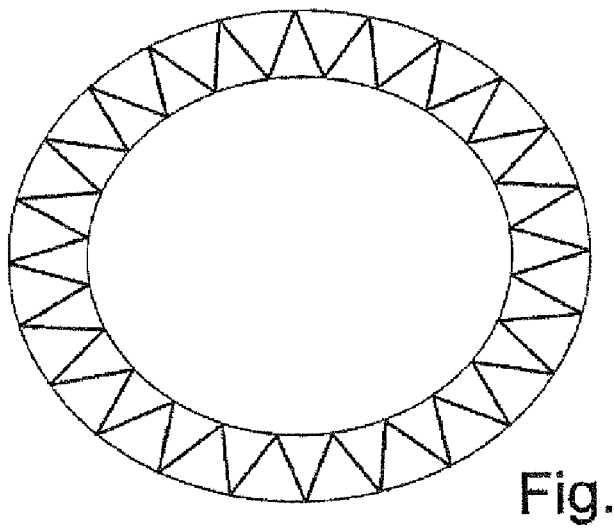
FIG. 5 shows a polygonal winding pattern schematically.
Figure 6:
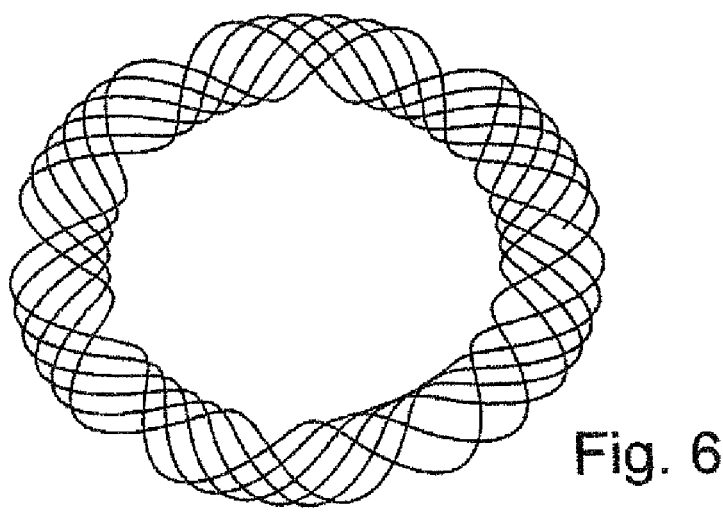
FIG. 6 shows a winding pattern in the form of an arc of a circle schematically.

FIG. 2 illustrates schematically two layers 30 and 40 according to the invention. One is wound spirally 30 and the other in a star-shaped manner 40. This results in a very close-meshed composite. The star-shaped composite structure 40 has, in contrast to a sinusoidal form, which places more material radially inward and outward than in the middle, an involute form 40, as also illustrated in FIG. 4. The quantity of the yarn per unit area of the friction lining thereby becomes markedly more uniform. Other angular forms, such as polygons, as in FIG. 5, but also arcs of a circle, as in FIG. 6, which are similar to a sinusoidal profile, and also an S-form 50, 60, as illustrated in FIG. 3, have also proved to be expedient with regard to a more uniform distribution of the yarn over the friction surface and therefore a reduction in undesirable thickenings, particularly on the inside and/or the outside diameter of the friction lining.

In order to produce the friction lining from a winding, as illustrated in FIG. 2, the method according to the invention, in a first preferred embodiment, provides for winding the two layers along the yarn from the same yarn material.

In a further preferred embodiment, there is in this case provision for the first layer to consist of a spiral with 10 turns and for the second layer to consist of 10 plies of yarn wound in a star-shaped manner, particularly preferably in involute form.

In a likewise preferred embodiment, there is in this case provision for the first layer to consist of a spiral with 5 turns and for the second layer to consist of 5 plies of yarn wound in a star-shaped manner.

In a further preferred embodiment, there is in this case provision for the first layer to consist of a spiral with 3 to 5 turns, for the second layer to consist of 3 to 5 plies of yarn wound in a star-shaped manner, for the third layer also to consist of a spiral with 3 to 5 turns and for the fourth layer to consist of 3 to 5 plies of yarn wound in a star-shaped manner.

In a further preferred embodiment, there is in this case provision for the first layer to consist of 2 spirals, each with 5 turns, and for the second layer to consist of 5 plies of yarn wound in a star-shaped manner, particularly preferably in involute form.

In a further preferred embodiment, there is in this case provision for a winding to be wound from a sequence of a first and a second layer which is repeated four times. Depending on the desired layer thickness, in this case, the first layer is formed from one or two spirals.

In a further preferred embodiment, a star-shaped layer is wound even before the start of the winding of the sequence which is repeated four times, so that the two outer faces or outer layers of the winding are then formed by a star-shaped layer. In another preferred embodiment, a spiral layer forms the uppermost and the lowermost layer of the winding in the axial direction.

In two further preferred embodiments, the winding is produced in three layers. In this case, the two layer combinations spiral/star-shaped/spiral and star-shaped/spiral/star-shaped are obtained.

In a further preferred embodiment, different yarn material is used for winding the various layers. In a preferred embodiment, the layers formed from spirals are wound from yarn optimized in terms of burst rotational speed, and the layers wound in a star-shaped manner are wound from yarn optimized in terms of friction and of wear. For special purposes, in another preferred embodiment, the layers formed from spirals are wound from yarn optimized in terms of friction and of wear and the layers wound in a star-shaped manner are wound from yarn optimized in terms of burst rotational speed.

FIG. 3 illustrates schematically a course of the yarn in an S-form, this being restricted in the illustration to a single course between the inside and/or the outside diameter. The complete schematic winding pattern for the S-shaped course in FIG. 3 arises from the turn profile in involute form 40 in FIG. 2 and FIG. 4. A yarn profile according to the laying pattern 50 increases the yarn fraction in favor of the middle between the inside and/or the outside diameter, as compared with a yarn profile according to the laying pattern 60. Depending on purposes, both patterns constitute preferred embodiments.

LIST OF REFERENCE SYMBOLS

30 Spiral winding pattern
40 Involute winding pattern
50 S-shaped winding pattern
60 S-shaped winding pattern

The invention claimed is:

1. A method for producing a friction lining for clutches or brakes, produced from at least one winding, the winding, comprising:
   a plurality of plies of at least one impregnated yarn; and
   a plurality of layers,
   wherein the winding is wound from only two alternately successive layers, one layer being wound from a first predetermined number of spirals, which each have a predetermined number of turns, and the other layer being wound from a second predetermined number of plies wound in a star-shaped manner, and
   wherein the friction lining has a surface in which the winding is uniformly distributed.

2. The method of claim 1, wherein the two alternately successive layers are wound from different yarn.

3. The method of claim 1, wherein a spiral is wound from 2 to 100 turns.

4. The method of claim 1, wherein the first predetermined number amounts to 1 to 100 spirals.

5. The method of claim 1, wherein the second predetermined number amounts to 1 to 100 plies.

6. The method of claim 1, wherein the predetermined number of two alternately successive layers lies between 1 and 100.

7. The method of claim 1, wherein the winding is wound from an additional layer continuing an alternating layer sequence, so that two outer faces of the winding have a same layer type.

8. The method of claim 1, wherein the plies wound in a star-shaped manner are implemented in involute form.

9. The method of claim 1, wherein the plies wound in a star-shaped manner are implemented in the form of an arc of a circle.

10. The method of claim 1, wherein the plies wound in a star-shaped manner are implemented in an S-form.

11. The method of claim 1, wherein the plies wound in a star-shaped manner are implemented in polygonal form.

12. A friction lining for clutches or brakes, produced from at least one winding, the winding, comprising:
 a plurality of plies of at least one impregnated yarn; and
 a plurality of layers,
 wherein the friction lining has a surface in which the winding is uniformly distributed, and the winding is constructed from only two alternately successive layers, one layer consisting of a first predetermined number of spirals, which each have a predetermined number of turns, and the other layer consisting of a second predetermined number of plies wound in a star-shaped manner.

13. The method of claim 3, wherein the spiral is wound from 5 turns.

14. The method of claim 5, wherein the second predetermined number amounts to 5 plies.

* * * * *